(12) United States Patent
Purdy et al.

(10) Patent No.: US 12,704,467 B2
(45) Date of Patent: Aug. 11, 2026

(54) 3D MASKING IN A COMPUTED TOMOGRAPHY IMAGE

(71) Applicant: Faxitron Bioptics, LLC, Marlborough, MA (US)

(72) Inventors: Ciaran Purdy, Wilmington, DE (US); Baorui Ren, Andover, MA (US)

(73) Assignee: Faxitron Bioptics, LLC, Marlborough, MA (US)

( * ) Notice: Subject to any disclaimer, the term of this patent is extended or adjusted under 35 U.S.C. 154(b) by 275 days.

(21) Appl. No.: 18/580,262

(22) PCT Filed: Jul. 19, 2022

(86) PCT No.: PCT/US2022/037604
§ 371 (c)(1),
(2) Date: Jan. 18, 2024

(87) PCT Pub. No.: WO2023/009354
PCT Pub. Date: Feb. 2, 2023

(65) Prior Publication Data

US 2024/0345003 A1 Oct. 17, 2024

Related U.S. Application Data

(60) Provisional application No. 63/203,645, filed on Jul. 27, 2021.

(51) Int. Cl.
*G01N 23/046* (2018.01)
*G01N 23/083* (2018.01)
*G01N 23/10* (2018.01)

(52) U.S. Cl.
CPC ......... *G01N 23/046* (2013.01); *G01N 23/083* (2013.01); *G01N 23/10* (2013.01);
(Continued)

(58) Field of Classification Search
CPC ......... A61B 6/06; A61B 6/502; A61B 6/4035; A61B 6/0414; A61B 10/0283;
(Continued)

(56) References Cited

U.S. PATENT DOCUMENTS

D895,838 S 9/2020 Purdy et al.
2010/0223016 A1 9/2010 Gibson
(Continued)

FOREIGN PATENT DOCUMENTS

WO 2020/106888 5/2020

OTHER PUBLICATIONS

PCT International Search Report and Written Opinion in Application PCT/US2022/037604, mailed Oct. 14, 2022, 15 pages.
(Continued)

*Primary Examiner* — Irakli Kiknadze
(74) *Attorney, Agent, or Firm* — Merchant & Gould P.C.

(57) ABSTRACT

A method for masking a container in a computerized tomography (CT) image includes receiving a specimen secured in a container on a rotatable support surface and identifying the container. A mask corresponding to the container is determined. The specimen and container are rotated through a plurality of imaging angles. During rotation the specimen and container are imaged to obtain a set of 2D images and a 3D representation of the specimen and of the container are generated. A mask is applied to mask the 3D representation of the container. The resulting the 3D representation of the specimen is displayed.

20 Claims, 10 Drawing Sheets

(52) U.S. Cl.
CPC ................ *G01N 2223/3307* (2013.01); *G01N 2223/401* (2013.01); *G01N 2223/408* (2013.01)

(58) Field of Classification Search
CPC ... A61B 90/11; A61B 10/0096; A61B 6/5247; A61B 6/4417; A61B 6/50; A61B 10/0266; A61B 6/42; A61B 6/4441; A61B 6/4411; A61B 6/4429; A61B 6/4447; A61B 6/469; A61B 6/4435; A61B 6/4452; A61B 6/461; A61B 6/4208; A61B 6/588; A61B 6/40; A61B 6/4233; A61B 6/465; A61B 6/508; A61B 6/542; A61B 6/587; A61B 6/463; A61B 6/4405; A61B 6/025; A61B 6/467; A61B 6/44; A61B 6/46; A61B 6/4423; A61B 10/0041; A61B 10/0233; A61B 6/035; A61B 6/5229; A61B 6/5205; A61B 6/032; A61B 6/5258; A61B 6/00; A61B 6/488; A61B 6/0478; A61B 6/51; A61B 6/027; A61B 6/466; A61B 6/504; A61B 6/545; A61B 6/486; A61B 6/547; H01J 37/3023; H01J 37/3177; H01J 2237/30472; H01J 2237/31766; G21K 1/025; G21K 7/00; G01N 33/4833; G01N 2223/307; G01N 2223/6126; G01N 23/04; G01N 23/06; G01N 23/044; G01N 23/087; G01N 23/083; G01N 23/18; G01N 2223/309; G01N 2223/301; G01N 2223/3307; G01N 2223/3306; G01N 1/36; G01N 23/046; G01N 2223/3308; G01N 23/10; G01N 2223/401; G01N 2223/408; B01L 9/52; B01L 2300/0609; B01L 2300/123; B01L 2300/0809; B01L 3/508; G06T 7/10; G06T 7/62; G06T 7/0012; G06T 15/08; G06T 2207/10088; G06T 2207/20081; G06T 2207/10116; G06T 2207/20084; G06T 2207/10081; G06T 2207/10104; G06T 12/30; G06T 5/50; G06T 7/11; G06T 5/30; G06T 7/136; G06T 7/155; G06T 2207/20041; G06T 2207/20104; G06T 2207/20152; G06T 2207/30012; G06T 19/00; G06T 7/30; G06T 7/60; G06T 7/80; G06T 11/003; G06T 11/008; G06T 17/00; G06T 12/00; C12M 45/22; G06N 3/045; G06N 3/0464; G06N 3/08; G06N 3/09; G06N 3/0895; G06V 10/772; G06V 10/25; G06F 18/28
USPC .......................................... 378/4, 10, 19, 62
See application file for complete search history.

(56) References Cited

U.S. PATENT DOCUMENTS

| | | | | |
|---|---|---|---|---|
| 2011/0150309 | A1* | 6/2011 | Barfett | G06T 7/33 382/131 |
| 2015/0201896 | A1* | 7/2015 | Ollilainen | G06T 7/155 600/407 |
| 2015/0241593 | A1 | 8/2015 | Blanpied | |
| 2020/0268331 | A1 | 8/2020 | Purdy | |
| 2021/0358128 | A1* | 11/2021 | Behrooz | G06T 7/11 |
| 2022/0284570 | A1* | 9/2022 | Tan | G06N 3/09 |

OTHER PUBLICATIONS

PCT International Preliminary Report on Patentability in Application PCT/US2022/037604, mailed Feb. 8, 2024, 9 pages.

* cited by examiner

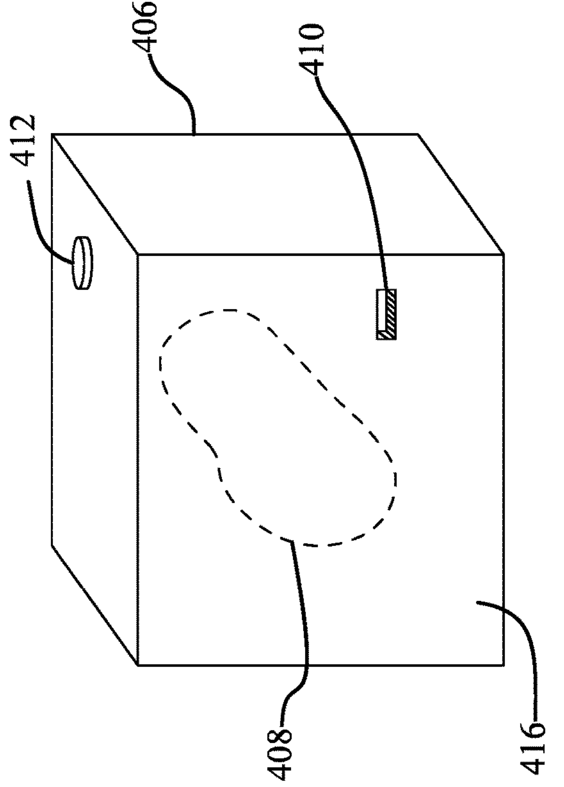
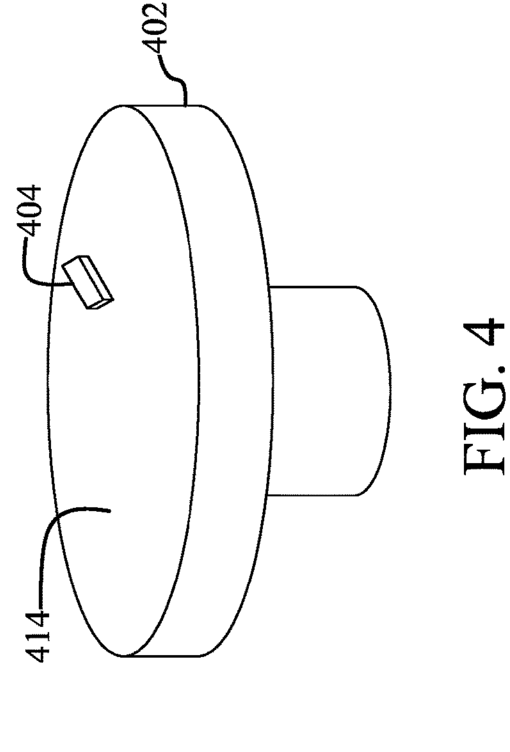
FIG. 4

606
detector
600
R
612
604
602
image #1
Imaging source
614
610
608

606
detector
600
R
612
604
602
image #2
Imaging source
614
608

606
detector
600
R
604
602
image #3
Imaging source
608
610

3D MASKING IN A COMPUTED TOMOGRAPHY IMAGE

CROSS-REFERENCE TO RELATED APPLICATIONS

This application is a National Stage Application of PCT/US2022/037604, filed on Jul. 19, 2022, which claims the benefit of U.S. Provisional Patent Application No. 63/203,645, filed Jul. 27, 2021, the entire disclosures of which are incorporated herein by reference in their entireties. To the extent appropriate, a claim of priority is made to each of the above disclosed applications.

INTRODUCTION

Imaging of excised breast tissue is vitally important to determine if a proper margin of error exists around cancerous or abnormal tissue and to determine if all undesirable tissue has been removed from the breast. For example, if any amount of cancerous tissue remains in the breast, cancer cells could grow and otherwise spread throughout the body. Thus, it is important to acquire accurate and clear images of the excised breast tissue.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods relating to three-dimensional masking in a three-dimensional computed tomography (CT) image of a specimen.

In one aspect, the technology relates to a method for masking a container in a computerized tomography (CT) image, the method including: receiving a specimen secured in the container on a rotatable support surface, wherein the rotatable support surface is configured to rotate about an axis at a known imaging distance to an imaging source; identifying the container; determining a mask corresponding to the container, based at least in part on the identification of the container; rotating the specimen in the container about the axis through a plurality of imaging angles; while rotating the specimen through the plurality of imaging angles, imaging the specimen with the imaging source to obtain a set of 2D images; based on the set of 2D images, generating a 3D image including a 3D representation of the specimen and a 3D representation of the container; applying the mask to the 3D image to mask the 3D representation of the container; and displaying the 3D image including the 3D representation of the specimen and the masked 3D representation of the container. In an example, the container is positioned between the imaging source and the specimen while rotating the specimen through the plurality of imaging angles. In another example, the container is identified from a set of known containers. In yet another example, identifying the container is based on at least one of: obtaining an image captured prior to obtaining the set of 2D images; receiving a user selection; and identifying an identifier on the container. In still another example, calibrating a system for performing the method prior to receiving the specimen secured in the container on the rotatable support surface.

In an example of the above aspect, the container and the rotatable support surface include a key for disposing the container in a container pose relative to the rotatable support surface when the container is received at the rotatable support surface. In an example, estimating a mask pose of the mask in the 3D image, based at least in part on the known imaging distance and the key; determining a tolerance of the mask pose; and based at least in part on the tolerance, adjusting the mask pose. In another example, determining the tolerance includes tracking an image-traceable marker on the container in the set of 2D images. In yet another example, applying the mask includes labeling a set of voxels in the 3D image. In still another example, labeling the set of voxels after the 3D image is generated.

In another example of the above aspect, applying the mask further includes labeling a set of pixels in the set of 2D images, and wherein the labeled set of voxels in the 3D image are based on the set of pixels labeled in the 2D images. In an example, applying the mask includes removing the labeled set of voxels from the 3D image. In another example, receiving an instruction to remove the mask from the 3D image; removing the mask from the 3D representation of the container in the 3D image; and displaying the 3D image including the 3D representation of the specimen and the 3D representation of the container.

In another aspect, the technology relates to an apparatus for imaging a specimen, the apparatus including: a housing defining an interior chamber; a pedestal disposed within the interior chamber of the housing, wherein the pedestal is configured to rotate about an axis and removably couple to a container holding the specimen, wherein at least one of the pedestal and the container include a key; an imaging source disposed within the housing, the imaging source configured to project a beam inside the interior chamber and positioned a known imaging distance from the axis of the pedestal; a display; a processor; memory storing instructions that, when executed by the processor, cause the apparatus to perform a set of operations including: upon receiving the container holding the specimen on the pedestal, identifying the container; determining a mask corresponding to the container, based on the identification of the container; rotating the container and the specimen about the axis through a plurality of imaging angles; while rotating the container and the specimen through the plurality of imaging angles, imaging the container and the specimen with the imaging source to obtain a set of 2D images; based on the set of 2D images, generating a 3D image including a 3D representation of the specimen and a 3D representation of the container; applying the mask to the 3D image to mask the 3D representation of the container; and displaying, on the display, the 3D image including the 3D representation of the specimen and the masked 3D representation of the container.

In an example, a pedestal key is on the pedestal, wherein the pedestal key is configured for interlocking with a container key on the container. In another example, the container includes an image-traceable marker and wherein the container is in a container pose in the interior chamber, the set of operations further including: estimating a mask pose of the mask in the 3D image, based at least in part on the known imaging distance and the key; identifying the image-traceable marker in at least one image of the set of 2D images; determining a tolerance of the mask pose, based the identification of the image-traceable marker; and based at least in part on the tolerance, adjusting the mask pose. In yet another example, applying the mask includes: labeling a set of voxels in the 3D image associated with a precise pose of the mask. In still another example, applying the mask further includes: removing the labeled set of voxels from the 3D image.

In another example of the above aspect, the set of operations further includes: receiving an instruction to remove the mask from the 3D image; removing the mask from the 3D representation of the container in the 3D image; and displaying the 3D image including the 3D representation of the specimen and the 3D representation of the container.

In another aspect, the technology relates to a method for masking a container holding a specimen, the method including: receiving the container holding the specimen on a rotatable support surface in a container pose relative to the rotatable support surface, the rotatable support surface configured to rotate about an axis at an imaging distance from an imaging source; identifying the container; determining a mask corresponding to the container, based on the identification of the container; rotating the container and the specimen about the axis through a plurality of imaging angles; while rotating the container and the specimen through the plurality of imaging angles, imaging the container and the specimen with the imaging source to obtain a set of 2D images; based on the set of 2D images, generating a 3D image including a 3D representation of the specimen and a 3D representation of the container; estimating a mask pose of the mask in the 3D image, based at least in part on the known imaging distance; identifying a position of a marker on the container in the set of 2D images; based on the identified position of the marker, determining a tolerance of the mask; adjusting the mask pose of the mask based on the tolerance; applying the mask in the adjusted mask pose to the 3D image to mask the 3D representation of the container; and displaying the 3D image including the 3D representation of the specimen and the masked 3D representation of the container.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

The accompanying figures illustrate one or more aspects of the disclosed methods and systems for three-dimensional masking in a three-dimensional computed tomography (CT) image of a specimen. In a specific example, a three-dimensional mask may be applied to a container in a three-dimensional image such that a three-dimensional image of a specimen secured within the container is shown without the container. In the appended figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label. Non-limiting and non-exhaustive examples are described with reference to the following figures.

FIG. 4 depicts container with a container key and a pedestal with a pedestal key.

Figure 1:
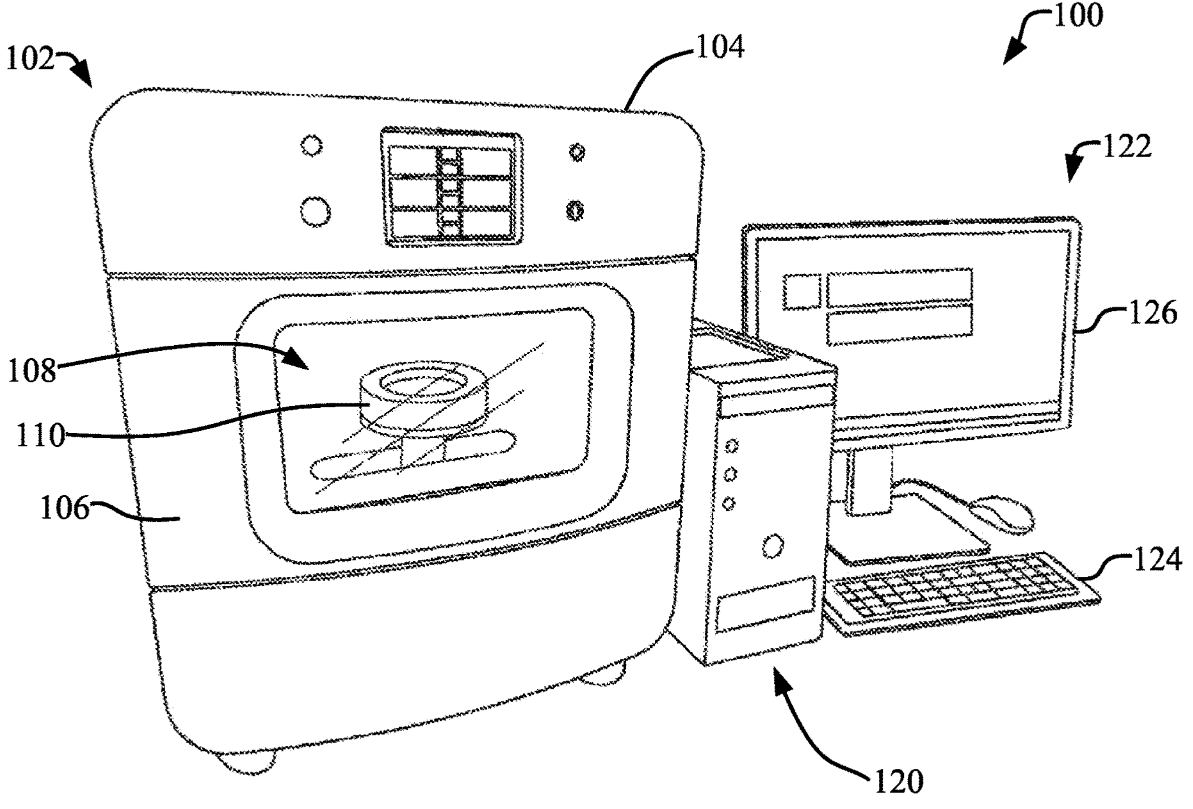
FIG. 1 depicts a specimen imaging system including a shielded imaging cabinet, a computing system, and peripheral devices.

While examples of the disclosure are amenable to various modifications and alternate forms, specific examples have been shown by way of example in the drawings and are described in detail below. The intention is not to limit the scope of the disclosure to the particular examples described. On the contrary, the disclosure is intended to cover all modifications, equivalents, and alternatives falling within the scope of the disclosure and the appended claims.

DETAILED DESCRIPTION

Various aspects of the disclosure are described more fully below, with reference to the accompanying drawings, which show specific example aspects. However, different aspects of the disclosure may be implemented in many different forms and should not be construed as limited to the aspects described herein; rather, these aspects are provided so that this disclosure will be thorough and complete and will fully convey the scope of the aspects to those skilled in the art. Aspects may be practiced as methods, systems, or devices. The following detailed description is, therefore, not to be interpreted in a limiting sense.

Imaging a tissue specimen (e.g., tissue excised from a breast) allows for margin assessment about a lesion contained in the specimen. When analyzing margins, an image is taken of the whole specimen, as received. Specimen imaging systems offer structures to image excised tissue utilizing an image type and image modality. An example of a specimen imaging system is the Hologic specimen radiography system, FaxitronR CT system, which offers 3D high resolution images of excised lesions to provide better margin assessments and surgical outcomes. A CT-based specimen imaging system has advantages over other imaging systems, including high isotropic spatial resolution in 3D, high low-contrast detectability (LCD), little to no tissue overlapping, 3D volume rendering and display capability, and quantitative tissue imaging. To realize these advantages from a CT scan, however, artifacts should be minimized.

A specimen often arrives at imaging equipment inside of a container. In an example, a specimen is excised from breast tissue in a surgical suite of a hospital and is secured inside of a container for safe transport in the hospital to a pathologist for imaging. If a specimen is imaged inside of the container in which it is received, artifacts from the container may reduce image quality and negatively impact margin assessment. If, alternatively, a specimen is removed from a container for imaging, orientation of the specimen relative to the remaining breast tissue may be lost or mislabeled. Additionally, removing a specimen from a container takes time to properly prepare, place, and label the specimen, thus reducing efficiency of specimen imaging.

One way to remove artifacts from a CT image is through CT segmentation. CT segmentation identifies and removes artifacts based on a measured brightness or density value. Because brightness of an artifact gradually reduces near an edge of the artifact, CT segmentation often does not produce clean boundaries to remove the artifact. If removal of an artifact is not precise or is blurred, important specimen image data may be unintentionally segmented from an image and may result in improper margin analysis.

Some specimen containers are radiolucent to reduce image artifacts. Radiolucent materials, however, may sacrifice integrity or security of a container. Additionally, even radiolucent materials cause some artifacts, even if not having a density distinguishable by CT segmentation. Thus, CT segmentation may not be possible for some containers, may cause imprecise boundary detection for artifact removal, and requires additional time to perform post-imaging segmentation analysis.

Accordingly, the present disclosure provides systems and methods for masking a 3D object in a 3D CT image that, in part, promotes accuracy and efficiency for specimen imaging. In an example, a container holding a specimen may be masked from a 3D CT image without applying CT segmentation. This disclosure thus allows for imaging of a specimen without removing the specimen from a container and produces a 3D image of a specimen at the completion of the CT scan, without displaying the container (or selectively displaying the container). Continuing the example of masking a container in a 3D image of a container and a specimen, a geometry of the container is identified prior to or during a CT scan. Additionally, an orientation and position of the container (together, a "pose" of the container) is determined. The geometry of the container is associated with a mask and the pose of the container is associated with a pose of the mask. The mask in the mask pose may then be applied to the 3D CT image representing the container and the specimen, such that a 3D representation of the specimen is displayed while masking the 3D representation of the container.

Figure 2:
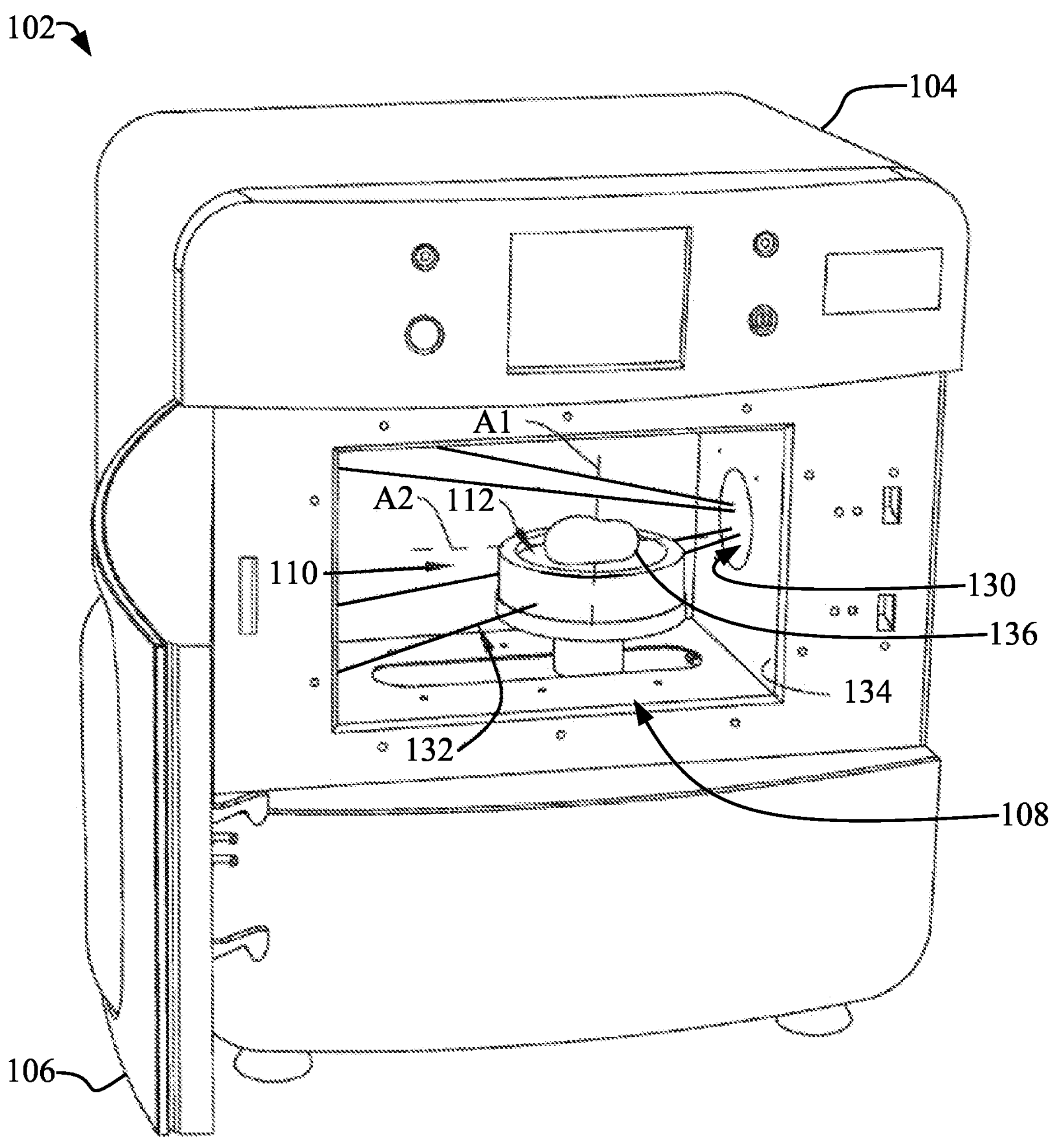
FIG. 2 depicts the shielded imaging cabinet of FIG. 1 including an interior chamber with a pedestal for receiving a specimen and an imaging source.
Figures 3A, 3B, 3C, 3D, 3E, 3F:
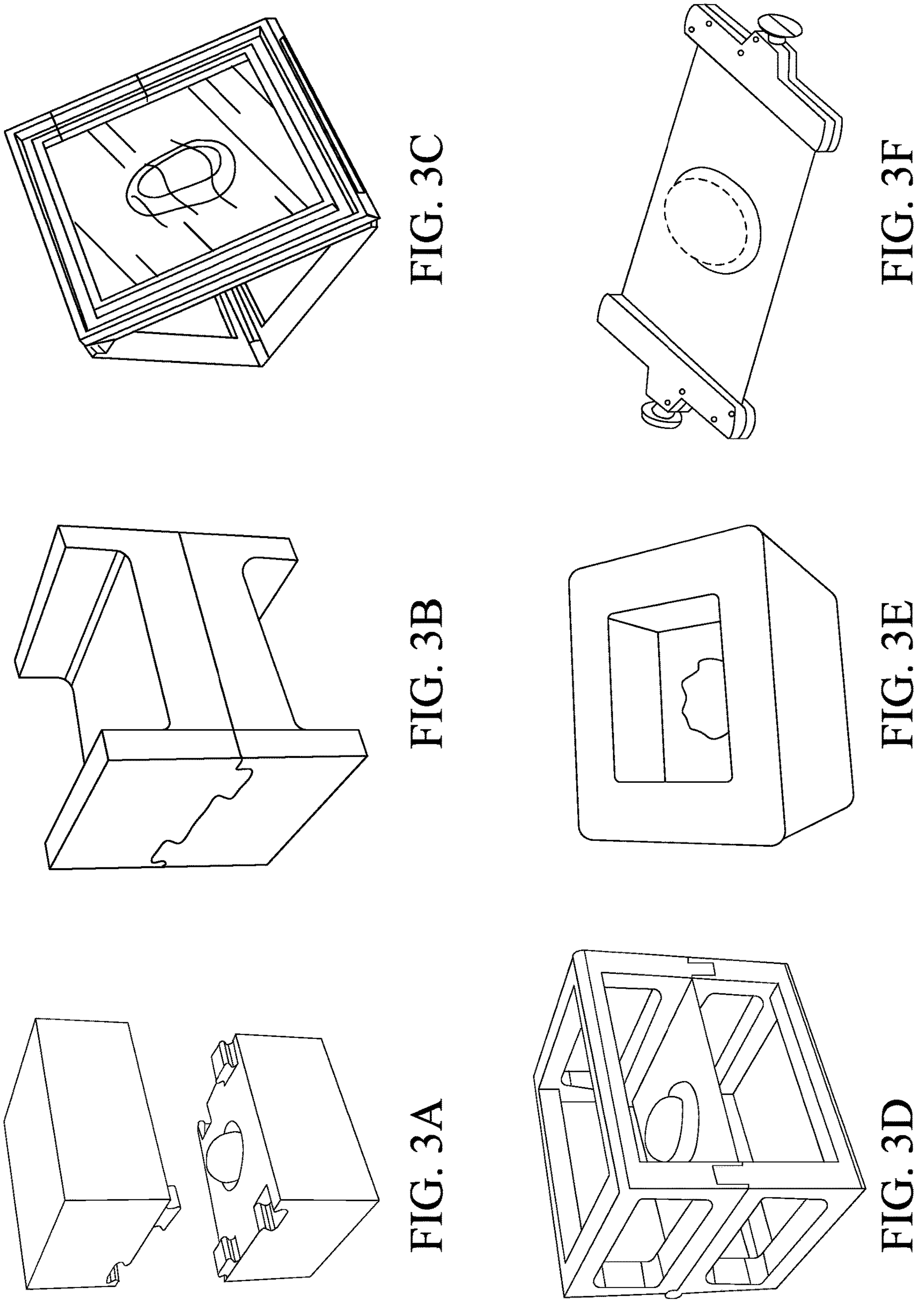
FIGS. 3A-F depict example containers for securing a specimen.

FIG. 1 depicts a specimen imaging system 100 including a shielded imaging cabinet 102, a computing system 120, and peripheral devices 122. Examples of a specimen imaging system for orienting a specimen are provided in PCT International Patent Application PCT/US2019/062481, filed on Nov. 20, 2019, and U.S. Design Pat. D895,838, filed Nov. 20, 2018, the disclosures of which are hereby incorporated by reference herein in their entireties. The shielded imaging cabinet 102 may include a housing 104 that generally defines an interior chamber 108 for receiving an object (e.g., a tissue specimen excised from breast tissue which may be secured in a container) at a pedestal 110. The interior chamber 108 may be accessed via a shielded access member 106 (e.g., door) in the housing 104. The interior chamber 108 may have any appropriate arrangement of walls (e.g., sidewalls, top walls, and bottom walls). The shielded access member 106 is movably coupled to the housing 104 between a closed position (e.g., as shown in FIG. 1) and an open position (e.g., as shown in FIG. 2), to provide access to the interior chamber 108. The housing 104 and the shielded access member 106 may be made of a material designed to contain sound, radiation, and/or energy emitted from an imaging source inside of the interior chamber 108 to prevent or reduce escape outside of the housing 104.

The pedestal 110 may be movable and rotatable relative to the housing 104 of the cabinet 102. The pedestal 110 may be configurable to receive an object (e.g., tissue specimen and/or a container holding a tissue specimen), such that the object moves with the pedestal 110 and is thus movable and rotatable relative to the housing 104 and walls of the interior chamber 108. The pedestal 110 may be at least partially constructed from any appropriate radiolucent or echogenic material to reduce the appearance of the pedestal 110 in an image constructed using an imaging source (e.g., imaging source 130 shown in FIG. 2) inside the cabinet 102.

The computing system 120 (e.g., including processor(s), memory, etc., as further described below in FIG. 10) may be communicatively coupled and/or electrically coupled with peripheral devices 122, including an input device 124 and a display 126. The computing system 120 may be configured to receive input from a medical professional at an input device 124 (e.g., keyboard, mouse, touchscreen, etc.). Input received at an input device 124 may cause the computing system 120 to initiate an imaging procedure using the cabinet 102. An imaging procedure may include moving and/or rotating the pedestal 110 and/or an object (e.g., tissue specimen and/or container) positioned at the pedestal 110 relative to an imaging source inside of the housing 104, emit and receive signals from the imaging source, process the signals from the imaging source, and generate various 2D and/or 3D images of the object for presentation to the medical professional (e.g., at display 126) or for use in margin identification and evaluation. The imaging procedure may include imaging the object with a plurality of imaging types or imaging modalities. In such an instance, the computing system 120 may also perform an image processing technique to combine image data obtained from the plurality of imaging types and/or imaging modalities into a set of reconstructed images of the object. The precise position and orientation of the pedestal 110 (e.g., a pedestal pose) in the housing 104 before, during, and after imaging may be known or detected by the computing system 120.

Although the computing system 120 is illustrated as a separate unit from the cabinet 102, the computing system 120 may be housed within the housing 104 of the cabinet 102 in a single unit or may be disposed remote from the cabinet 102 such as in a separate room or in a geographically remote location. In either instance, the computing system is communicatively coupled with the cabinet 102 (e.g., wired or wirelessly via one or more networks or servers) using processor(s) that are configured to execute one or more sets of computer-readable instruction sets to carry out the various determinations and functionalities disclosed herein (e.g., positioning and/or rotating the pedestal 110 within the interior chamber 108, triggering an imaging source to emit a beam through an object positioned at the pedestal 110, generating image data, generating a mask for the image data, etc.).

FIG. 2 depicts the shielded imaging cabinet 102 of FIG. 1 including the interior chamber 108, with the pedestal 110 for receiving a specimen 136 and an imaging source 130. The pedestal 110 may include a receiving surface 112 at which a specimen 136 is positioned. Although a specimen 136 positioned directly on the receiving surface 112 is shown in FIG. 2, a container holding a specimen 136 positioned on the receiving surface 112 is also appreciated.

The specimen 136 and/or container may be gravitationally seated on the receiving surface 112 of the pedestal or otherwise removably coupled to the receiving surface 112 of the pedestal 110 (e.g., with a coupling member or structure), such that the specimen 136 moves with movement of the pedestal 110. A coupling member or structure may removably couple a container in a known position and orientation (i.e., place a container in a known container pose) relative to the receiving surface 112 (e.g., the container and the receiving surface 112 may be keyed). Alternatively, the receiving surface 112 of the pedestal 110 may rotate relative to the pedestal 110, such that the specimen 136 may move with movement of the receiving surface 112. The specimen 136 and/or container may be centered on the pedestal 110 and/or receiving surface 112 or may be off-center. Additionally, the specimen 136 and/or container may be oriented relative to the pedestal 110 based on a location of the imaging source 130 relative to the pedestal 110 (e.g., a distance between the center of the specimen 136 and the imaging source 130) and a location of a lesion in the specimen 136 (e.g., orientation of the specimen 136 relative to the imaging source 130), to allow imaging of the lesion in the specimen 136 from a particular direction, such as to identify margins around a lesion in a particular direction.

As further described herein, the pedestal 110 and/or receiving surface 112 may rotate about a rotation axis A1. The rotation axis A1 may be centered with the pedestal 110 and/or receiving surface 112, such that the center of the pedestal 110 and/or receiving surface 112 remains fixed at the rotation axis A1 while rotating. Alternatively, the rotation axis A1 may be off-center from the pedestal 110 and/or receiving surface 112, such that the center of the pedestal 110 and/or receiving surface rotates about the rotation axis A1 when rotating. The rotation axis A1 may be fixed distance from the center of the pedestal 110 and/or receiving surface 112 such that movement of the pedestal 110 and/or receiving surface 112 within the interior chamber 108 also moves the rotation axis A1 within the interior chamber 108. When rotating the pedestal 110 and/or receiving surface 112 about the rotation axis A1, the rotation axis A1 may be a fixed distance relative to the imaging source 130 and/or the center of the pedestal 110 may be a fixed distance relative to the imaging source 130 and/or the center of the receiving surface may be a fixed distance relative to the imaging source 130, such that the pedestal 110 is in a known position and orientation (e.g., a pedestal pose) in the interior chamber 108.

The imaging source 130 may be non-movably coupled to a portion of the housing 104 and/or a beam sidewall 134 of the interior chamber 108. The imaging source 130 emits a beam 132 (e.g., x-ray, ultrasound, etc.) to be received at a detector (e.g., in the case of an x-ray beam 132 the detector may be coupled to a sidewall opposite of the beam sidewall 134, or in the case of an ultrasound beam 132 the detector may be coupled to the beam sidewall 134). A plurality of imaging sources 130 may be housed in the cabinet 102 and may be located at different locations within the housing 104. The beam 132 emitted from the imaging source 130 may travel along an imaging axis A2 through a portion of the specimen 136 and/or a portion of the container and/or a portion of the pedestal 110. The beam 132 may expand symmetrically about the imaging axis A2 as the beam travels from its origination at the imaging source 130 (e.g., in the shape of cone or a pyramid).

FIGS. 3A-3F and 4 depict example containers for securing a specimen. Specifically, FIGS. 3A-3F show various shapes and sizes of containers with different means of securing a specimen and FIG. 4 shows container features that may be included in or on the container, such as a container key and an identification element.

As shown in FIGS. 3A-3F, a container for securing and/or transporting a specimen may have a variety of shapes, including a cube, rectangular prism, cylinder, triangular prism, cone, sheet, etc. A container shape may vary based on a desired function or application. For example, a container for transporting a specimen may encase a specimen to maintain tissue integrity, sanitation, and tissue orientation (e.g., relative to unexcised breast tissue). Alternatively, a container for imaging a specimen may be relatively planar or tray-like to reduce image artifacts. As otherwise described herein, a container that is being masked may include at least a portion of the container that produces an artifact in a CT image of the specimen. For example, a portion of the container may be positioned between the specimen and the imaging source (e.g., imaging source 130 in FIG. 2 or imaging source 504 in FIG. 5) at one or more imaging angles as the container and the specimen rotate (e.g., as a pedestal rotates) through a CT scan.

FIG. 4 depicts container features (e.g., a container key 410 and an identifier 412) of a container 406 in an imaging system 400. In the example shown in FIG. 4, a container 406 of any shape (e.g., a rectangular prism is depicted) includes a container key 410 and an identifier 412. The container 406, as shown, is securing a specimen 408 therein. The container key 410 of the container 406 may removably couple to a pedestal key 404 of a pedestal 402, which may be the same as or similar to pedestal 110 in FIG. 1. The pedestal key 404 may be on or near a receiving surface 414 of the pedestal 402 and the container key 410 may be on or near a supporting surface 416 of the container 406. The container key 410 and the pedestal key 404 may be shaped relative to each other such that the container key 410 removably couples with a physical interaction with the pedestal key 404. The key-based coupling mechanism may cause the container 406 to be secured in a known position and orientation (e.g., a container pose) relative to the pedestal 402 (which may also be in a pedestal pose known by the imaging system 400, as described herein). Thus, when the container 406 is removably coupled to the pedestal 402 via keys, the container 406 is in a known container pose in the imaging system 400. In the container pose caused by removably coupling the container key 410 and the pedestal key 404, the supporting surface 416 of the container 406 may rest on the receiving surface 414 of the pedestal 402.

The pedestal key 404 may removably couple with container keys 410 on multiple containers 406. For example, the container key 410 and pedestal key 404 may be universal for a variety of container shapes and sizes (e.g., container shapes shown in FIGS. 3A-3F). Alternatively, a container key 410 may be specific to a keyed pedestal 402. For example, a first pedestal may have a first pedestal key that removably couples with a first set of container keys and a second pedestal may have a second pedestal key that removably couples with a second set of container keys. By specifying which containers may couple with certain pedestals, containers being imaged in the imaging system 400 may be controlled. In an example, compatible keys may indicate that a geometry of the container is known by the imaging system 400 and incompatible keys may indicate that a geometry of the container is not, or not yet, known by the imaging system 400. In another example, compatible keys may indicate that a container is a proper size for the pedestal 402 and/or imaging system 400 and incompatible keys may indicate that a container is an improper size for the pedestal 402 and/or imaging system 400. The pedestal 402 may or may not accommodate containers that do not have a container key 410.

Although the example pedestal key 404 shown in FIG. 4 is raised relative to the receiving surface 414 of the pedestal 402, the pedestal key 404 may have any shape or material. For example, the pedestal key may have a shape or material that is capable of removably coupling a container 406 to the receiving surface 414, or instructing a user to align a container 406 at the receiving surface 414 at a precise position and orientation of the container 406 (e.g., a precise container pose). Examples of pedestal keys include a recessed key, a protruding key, hook and loop fasteners, clips, magnets, an alignment marker, etc.

As also shown in FIG. 4, the container 406 may include an identifier 412. The identifier 412 may indicate an identity of a container 406 or provide information related to a geometry of the container 406. For example, when a container 406 is identified based on the identifier 412 (e.g., user-selected or detected by the imaging system 400), the imaging system 400 may determine a mask for a 3D CT image with the same geometry as the identified container 406. The mask may be applied to a 3D CT image that includes the container 406 as the 3D image is constructed by the imaging system 400, as otherwise described herein.

The identifier 412 may be recognized by an imaging system 400 or by a user of the imaging system 400. The identifier 412 may be two-dimensional or three-dimensional. Examples of identifiers include scannable codes (e.g., barcodes, QR codes, etc.), RFID tags, radiopaque beads, three-dimensional shapes protruding from or receding into a surface of the container 406, etc. The identifier 412 may be positioned on a surface of the container 406 that is viewable by a user of the imaging system 400 or viewable by the imaging system 400 when the container 406 is resting on the receiving surface 414 and/or when the container 406 is rotated through a plurality of imaging angles for CT imaging. In an example, the identifier 412 may be positioned on a surface of the container 406 that is substantially perpendicular to the supporting surface 416 of the container 406. In some examples, a container 406 may not include an identifier 412 or an identifier 412 may not be recognizable. In this instance, a geometry of the container 406 may be determined based on pre-scan geometric identification techniques or container calibration, described below.

Figure 5:
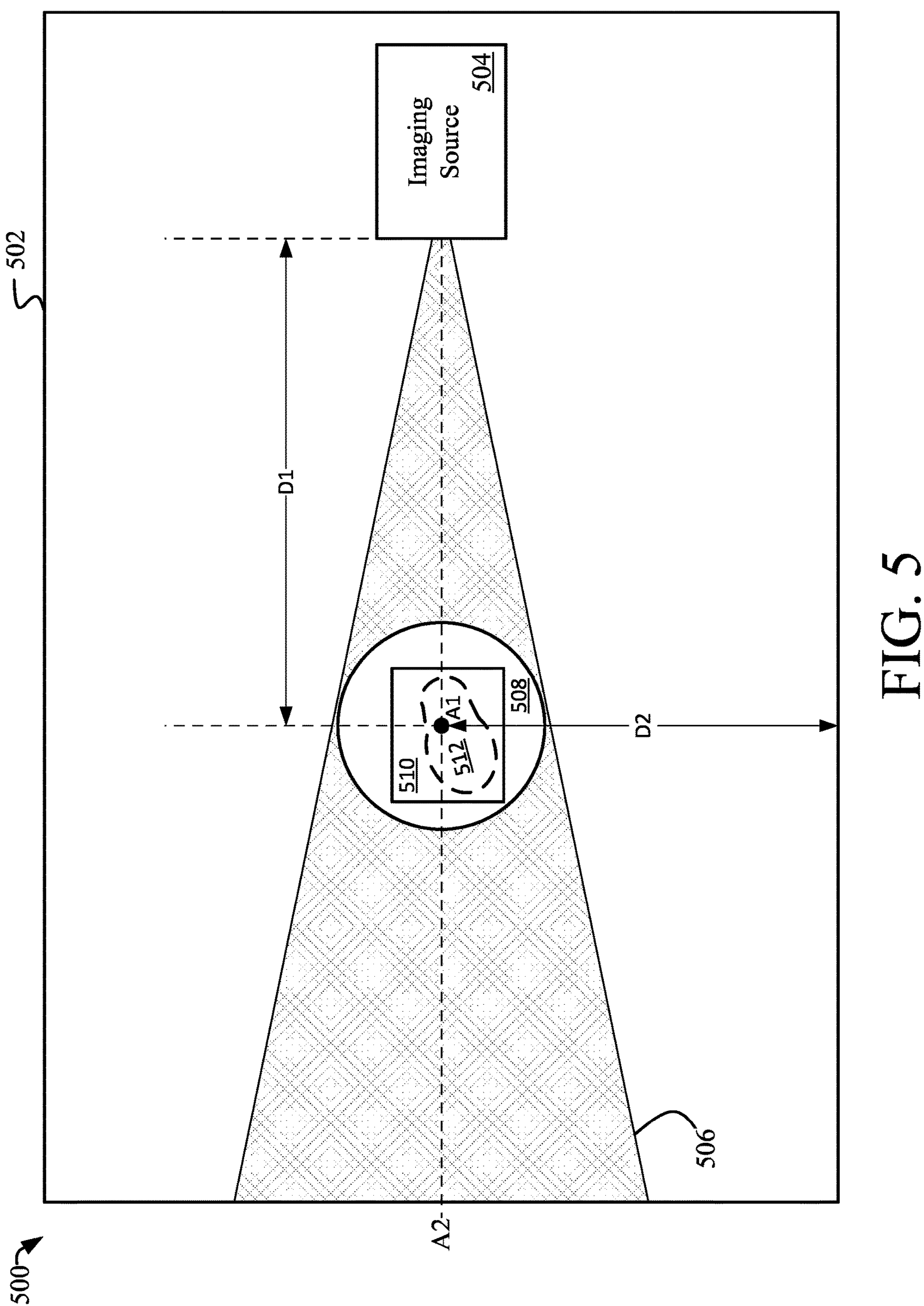
FIG. 5 depicts a top-down view of an imaging system including a movable and rotatable pedestal, a container for securing a specimen, and an imaging source.

FIG. 5 depicts a top-down view of an imaging system 500 including a movable and rotatable pedestal 508, a container 510 for securing a specimen 512, and an imaging source 504. The imaging system 500 may have similar features as the system 100 shown in FIG. 1. For example, a pedestal 508 and an imaging source 504 may be contained within an interior chamber 502 of an imaging system 500 (e.g., a cabinet and/or a computing system).

As shown in FIG. 5, the pedestal 508, container 510, and the specimen 512 rotate about a rotation axis A1 of the pedestal 508. The imaging axis A2 defines the axis along which a beam 506 travels, as emitted from the imaging source 504. Although the example shown in FIG. 5, depicts an intersection of the imaging axis A2 and the rotation axis A1, any arrangement of the container 510, specimen 512, pedestal 508, imaging axis A2, and rotation axis A1 that allows for at least a portion of the beam 506 to intersect at least a portion of the specimen 512 should be appreciated. The rotation axis A1 and imaging axis A2 are all depicted as intersecting in FIG. 5, for simplicity and clarity.

As further described herein, the pedestal 508 (or a portion thereof) is rotatable about a rotation axis A1. While the pedestal 508 rotates about the rotation axis A1, the rotation axis A1 of the pedestal 508 may be a fixed imaging distance D1 from the imaging source 504 and a fixed lateral distance D2 from a wall of the interior chamber 502 of the imaging system 500. The pedestal 508 may rotate relative to the imaging source 504 through a plurality of imaging angles at a respective plurality of rotation positions. The rotation of the pedestal 508 may be clockwise, counterclockwise, or both (e.g., a motor that rotates the pedestal 508 may rotate in both directions to reduce wear on the motor). The imaging system 500 may have a home position and orientation for pedestal 508 (e.g., a home pedestal pose or initial pedestal pose). For example, a home pedestal pose may include a home distance between the rotation axis A1 of the pedestal 508 and the imaging source 504 and a home rotational orientation of the pedestal 508 about the rotation axis A1.

The container 510 shown in FIG. 5 may be similar to one or more of the containers described herein (e.g., the containers shown in FIGS. 3A-3F and container 406 in FIG. 4). For example, the container 510 may be keyed with the pedestal 508 such that the container 510 is in a known container pose relative to the pedestal 508 and/or the imaging source 504 and/or the imaging system 500 when the container is removably coupled to the pedestal 508 with a key.

Additionally, the container 510 may include an identifier associated with a geometry of the container 510 that is identifiable by the imaging system 500 or selectable at the imaging system 500. For example, a user of the imaging system 500 may identify a container at the imaging device (e.g., by selecting a container from a list of pre-determined containers or specifying geometric information about the container). As another example, the imaging system 500 may identify the container 510 by identifying an identifier on the container. As described above, in the situation where a container is not identified by the imaging system 500 (e.g., an identifier is missing or unidentifiable, or the geometry of the container 510 is otherwise not known by the imaging system 500), geometry of the container 510 may be determined based on pre-scan geometric identification techniques or container calibration.

Pre-scan geometric identification techniques may include obtaining an image of a specimen prior to completing a CT scan. For example, a pre-shot may be obtained prior to beginning a CT scan or an image may be obtained during a CT scan (e.g., during a first or second image obtained during a CT scan). Geometries of the container may be identified from an image (e.g., pre-shot or one or more images of a CT scan) based on image processing techniques, such as matching an identified outline of a container with a list of known container shapes/sizes, machine learning, color identification matching (e.g., in an example where a color corresponds with a pre-programmed container geometry), among other image processing techniques to identify and/or determine a geometry of a container in an image.

Additionally or alternatively, a container geometry may be added to a list of container geometries available for selection on the imaging system 500. A customized geometry or new geometry may be added for a specific container by scanning a container having the same geometry, identifying a geometry from a prior scan, uploading a geometry to the imaging system 500, other data transfer techniques, or other techniques to provide geometry information for a specific container to the imaging system 500.

In an example where geometry information for a specific container is provided to the imaging system 500 via a calibration scan, the target container or a phantom may be used. The target container or the phantom may be scanned for calibration of the container's geometry by the imaging system 500 without the presence of a specimen (e.g., the container is imaged without securing a specimen). In an example, an imaging system 500 may include a list of containers for which geometries have yet to be calibrated. In this instance, a phantom or target container may include a calibration indicator to assist a user in selecting the pre-listed container associated with the phantom or target container. For example, common color coding may associate a phantom with a container geometry yet to be calibrated by the imaging system. Additionally or alternatively, a warning message may display on a display of the imaging system 500 to confirm that a correct phantom is selected for calibration. The geometry associated with the new or calibrated container may then be saved by the imaging system 500 for future masking of a container.

In some instances, a known geometry of the container (e.g., pre-programmed geometry or new/calibrated geometry) and a starting container pose of the container, as estimated from a keyed relationship between the container 510 and the pedestal 508, may not result in a precise enough estimated mask pose to precisely represent the container 510 in a 3D CT image (e.g., edges of a mask in an estimated mask pose may be desired to be within a few microns of a 3D representation of a container). For example, the estimated mask pose may be adjusted such that the mask to be applied to a 3D image precisely aligns with the orientation and position of a 3D representation of the container in the acquired image. In an example where a mask pose is required or desired to be adjusted, a tolerance or uncertainty of the mask pose may be determined by the imaging system 500. A minimization step may be performed by the imaging system 500 before or during the CT scan to adjust the estimated mask pose. For example, a tolerance or uncertainty to adjust a mask pose may be determined from a pre-shot or from one or more images obtained during the CT scan.

The tolerance or uncertainty of the mask pose may be determined based on a pose identifier (e.g., identifier 412 in FIG. 4 or second identifier) associated with the container 510. The position of the pose identifier relative to the geometry of the container 510 may be known by the imaging system (e.g., the pose identifier position may be saved as part of the geometry for a container). If the pose identifier is a three-dimensional marker, a precise mask pose (e.g., a mask pose adjusted based on a determined tolerance) may be determined from a 2D pre-shot or from one 2D image in the CT scan showing the pose identifier. In another example, a position of a pose identifier may be tracked across two or more 2D images in the CT scan to determine a precise mask pose at any time during the CT scan. An identified position of a pose identifier on a container 510 may be compared to the stored geometry (e.g., associated with the mask) and container pose (e.g., associated with the mask pose, as estimated based on a keyed container resting on a pedestal in a known pedestal pose). A tolerance may be determined to adjust the mask pose based on a positional difference between a precise pose identifier position (e.g., pose identifier position in an image) and an estimated pose identifier position (e.g., based on the mask and the estimated mask pose).

Figures 6A, 6B, 6C:
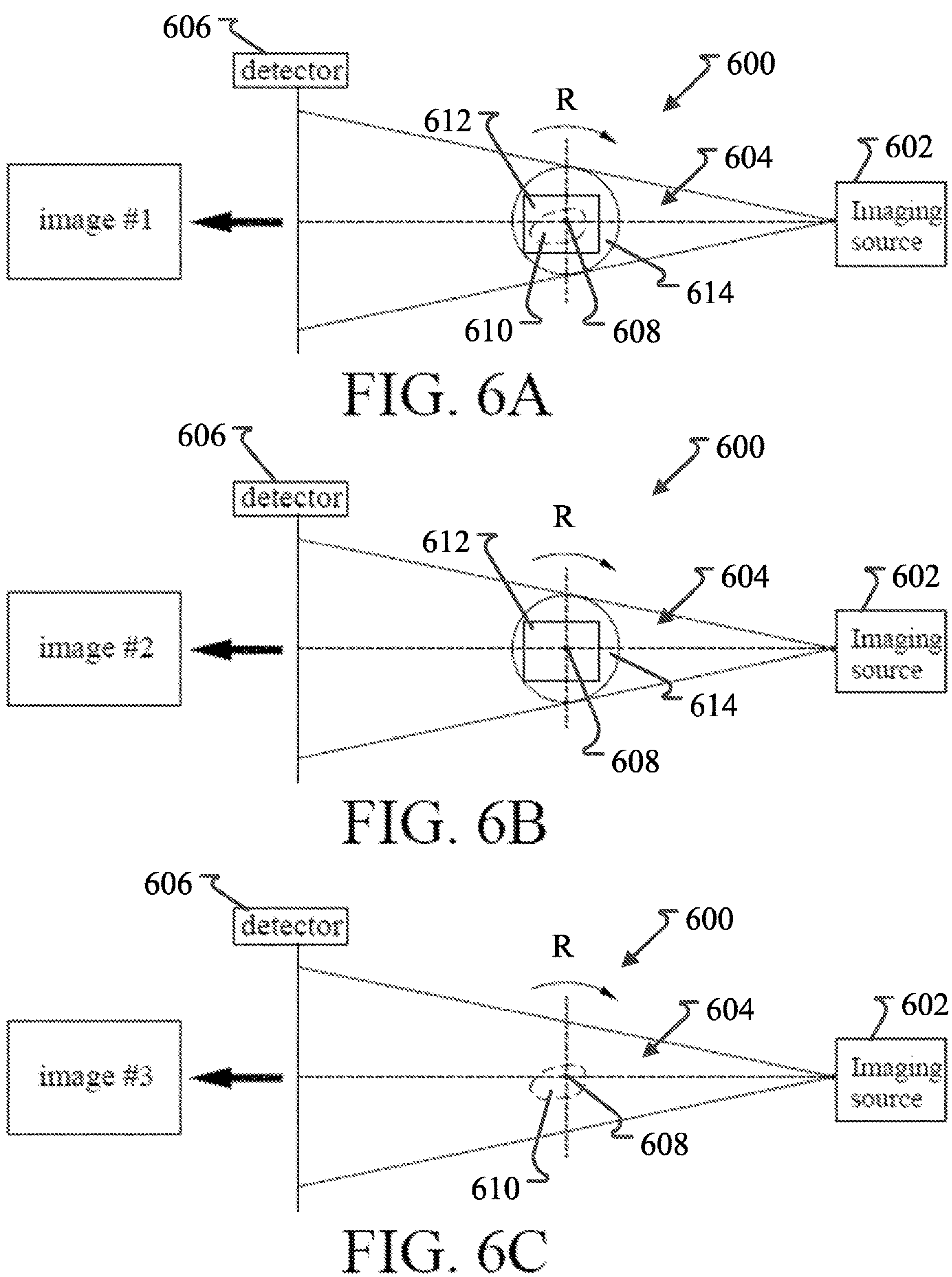
FIGS. 6A-6C depict modifying pixel values of a 2D projection image prior to CT image reconstruction.
Figure 7:
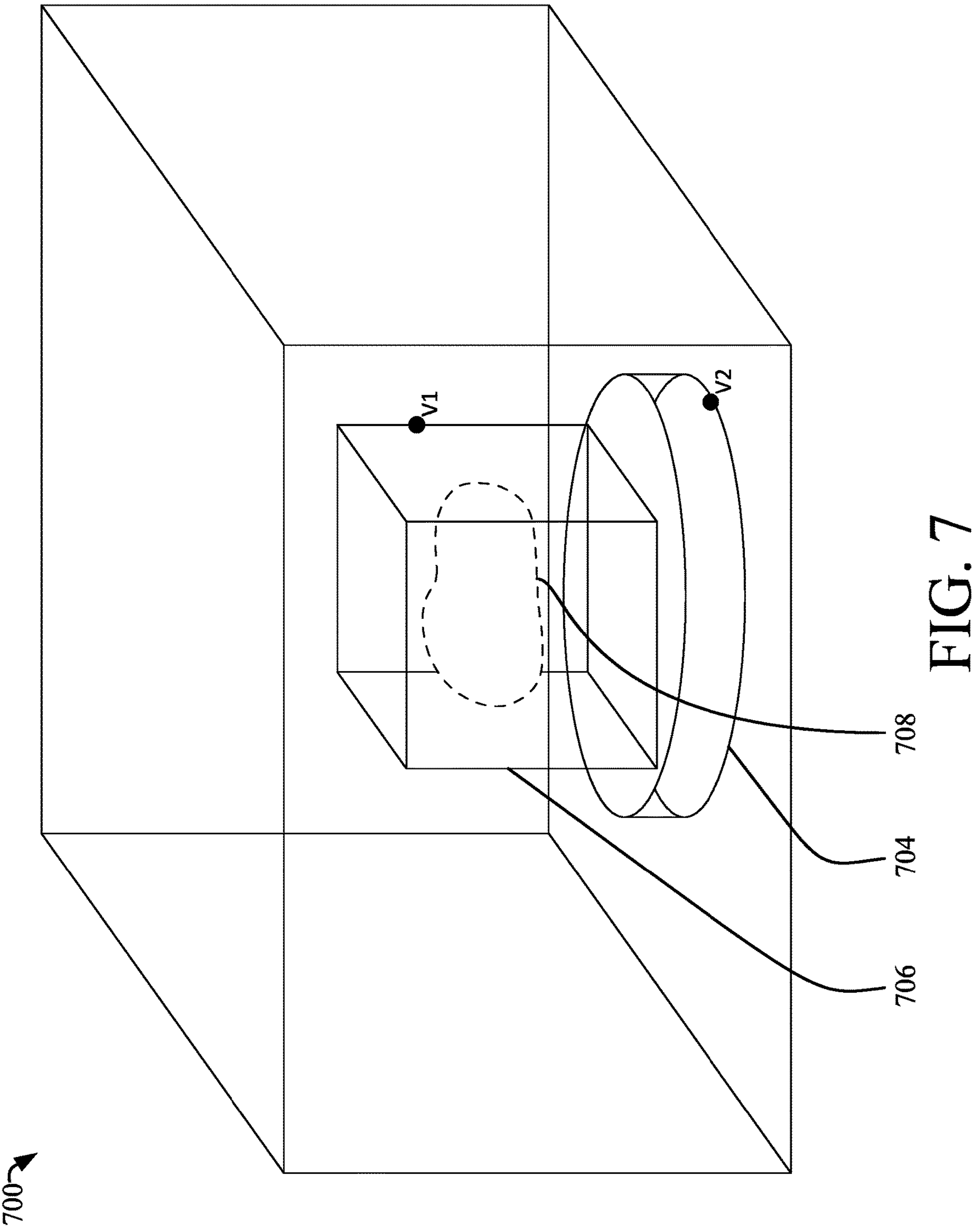
FIG. 7 depicts voxels identified in a 3D representation of a specimen secured in a container.

FIGS. 6A-6C and 7 show two different examples for applying a mask to a three-dimensional image obtained using CT scanning technology. FIGS. 6A-6C depict a 2D based approach to implement the invention, and FIG. 7 is a 3D based approach to implement the invention. In FIGS. 6A-6C, masking is applied to each 2D projection images of CT scan so that the x-ray signal of container and pedestal are removed in each 2D images. Then 3D reconstruction images of specimen object are obtained without the presence of container and pedestal in them. Alternatively, in FIG. 7, voxels are identified in a 3D image constructed from a CT scan. A location of pixels or voxels associated with an artifact to be masked is determined based on the known geometry and pose of the artifact to be removed, which may be adjusted based on tolerance, as otherwise described herein.

A 2D based approach is depicted in FIGS. 6A-6C. There, pixel values of each 2D projection images may be modified prior to CT image reconstruction to result in masking. Each of FIGS. 6A-6C depict a CT imaging system 600 that includes an x-ray imaging source 602 that emits x-rays 604 towards a detector 606.

In FIG. 6A, a series of 2D projection images is taken while specimen object rotates R around the isocenter 608 of the CT system 600. At each projection angle, image #1 is acquired by the detector 606, which carries x-ray attenuation information by specimen object 610, container box 612, and pedestal 614. In order to obtain a CT reconstruction slice image with container box 612 and pedestal 614 being masked out (such as depicted in FIG. 6C), the x-ray attenuation by container box 612 and pedestal 614 in image #1 need to be removed in image #1. X-ray attenuation image by container box 612 and pedestal 614 alone is illustrated by image #2 in FIG. 6B. It can be measured directly with calibration scan before the specimen CT scan, or it can be generated based on a system model from the calibration scan and known projection view angle for image #1. Therefor image #2 can be obtained for the same view angle that image #1 is acquired. With image #1 and image #2 available, a subtraction is performed mathematically between image #1 and image #2 to get a new image #3 as depicted in FIG. 6C, which effectively is the x-ray attenuation image by the specimen object 610 alone without the presence of container box 612 and pedestal 614. The complete set of image #3 will go through CT image reconstruction to generate specimen object 610 alone image without container box 612 and pedestal 614, which effectively has the container box 612 and pedestal 614 masked out. This masking may be performed on a pixel-by-pixel basis.

An example of a voxel-by-voxel implementation of a mask is shown in FIG. 7. Specifically, FIG. 7 shows a 3D image of a representation of a pedestal 704, container 706, and specimen 708 obtained from a CT scan. The 3D image may be constructed in real time as the CT scan is performed. During or after the construction of the 3D image 700, the voxels associated with artifacts in the 3D image 700 (e.g., voxel V1 corresponding with the representation of the container 706 and voxel V2 corresponding with the representation of the pedestal 704) may be removed or labelled.

If the artifact-related voxels are removed from the 3D image 700, this will result in a 3D image 700 that is irreversibly masked. To allow removal of the mask from the 3D image 700, two copies of the 3D image 700 may be maintained: one 3D image with no voxels removed and 3D image with the artifact-related voxels removed. The 3D image may then be shown masked and unmasked by displaying either the 3D image with voxels removed or the 3D image without voxels removed. As an alternative to removing artifact-related voxels from a 3D image 700, the artifact-related voxels may instead be labelled or tagged. Artifacts may then be reversibly masked by hiding and showing the labelled voxels. As described above with respect to pixels, labelling or tagging of voxels may be artifact-specific to allow masking of artifacts separately.

Figure 8B:
FIG. 8B depicts a 3D representation of a specimen secured in the container, while masking the container.
Figure 8B:
Figure 8A:
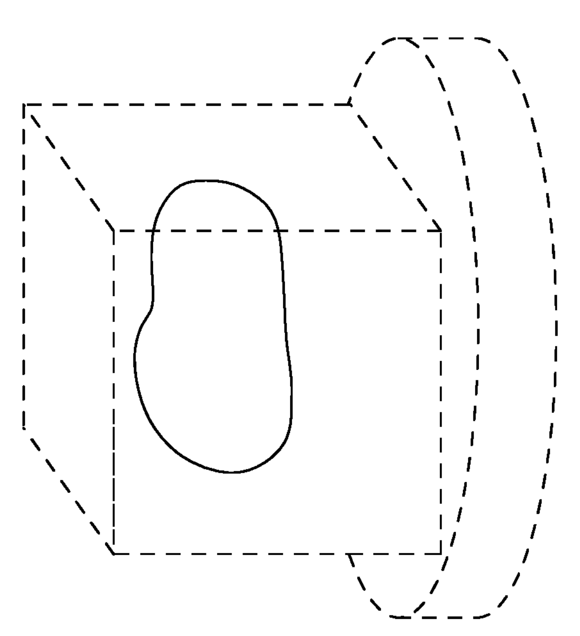
FIG. 8A depicts a 3D representation of a container and a specimen secured in the container, without masking the container.

FIGS. 8A-8B show three-dimensional displays of a specimen with functionality to toggle a mask on and off (e.g., a reversible mask). Specifically, FIG. 8A depicts a 3D representation 800A of a container securing a specimen, without masking the container. FIG. 8B depicts a 3D representation 800B of a specimen secured in the container, while masking the container. The mask may be toggled on and off based on a user selection. In another example, the mask may be toggled on and off based on a portion of the 3D image being displayed. For example, if a portion of the 3D image displayed is magnified near a border of the mask, the mask may be automatically removed. As shown in FIG. 8A, when a mask is not applied, the 3D image includes a representation of the specimen and representation of various artifacts (e.g., a representation of a container and a representation of a pedestal). When the 3D image is masked, only the representation of the specimen remains while the artifacts are removed.

Figure 9:
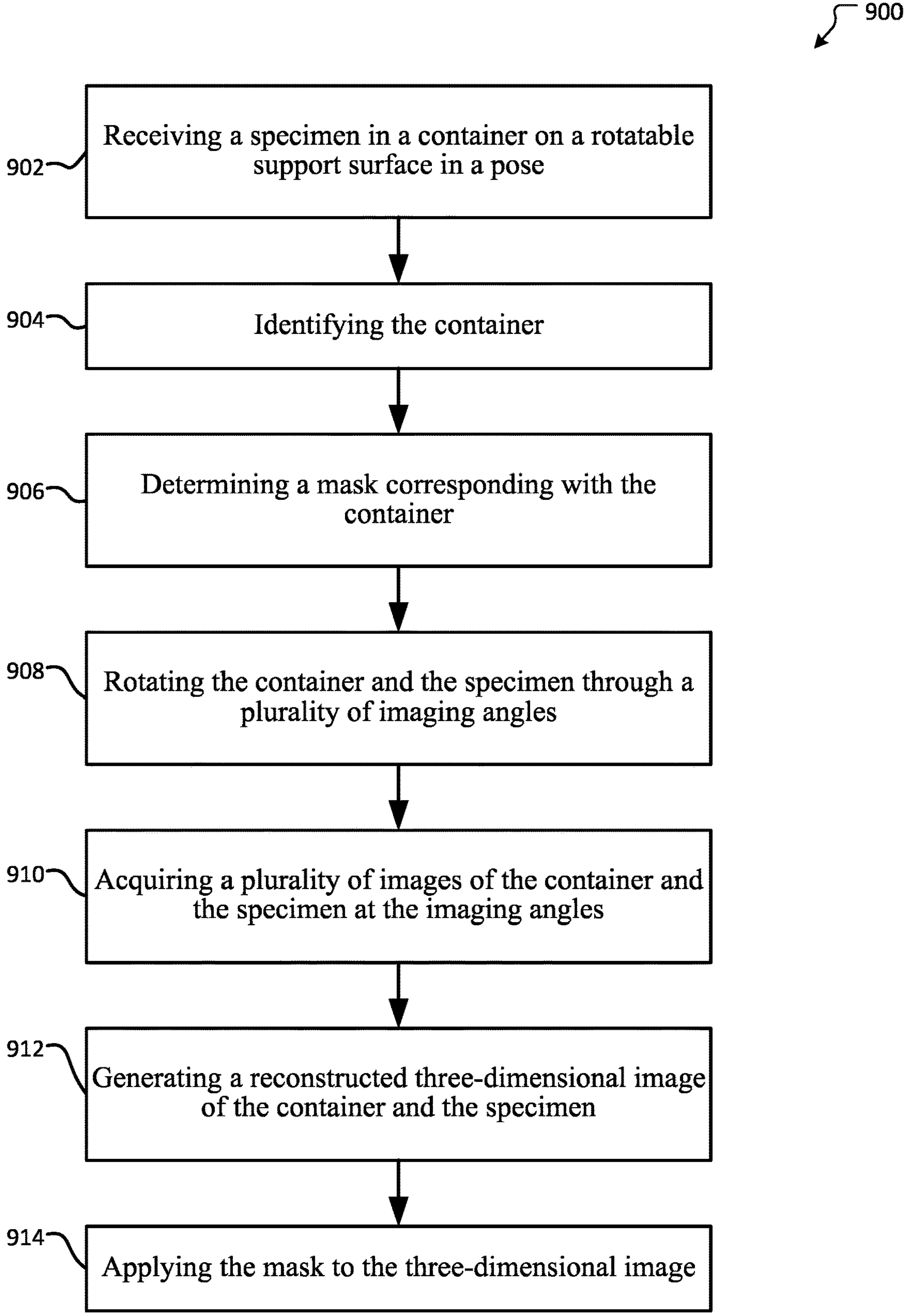
FIG. 9 depicts an example method for masking a container in a 3D image.

FIG. 9 depicts an example method for masking a container in a 3D image. In FIG. 9, some of the operations may be optional. The method 900 of FIG. 9 may be implemented using one or more of the systems described herein, such as imaging system 100, imaging system 500, or operating environment 1000).

Method 900 begins at operation 902 where a specimen is received in a container on a rotatable support surface in a container pose. The container may include the same or similar features as other containers described herein. For example, the container may include a container key and one or more identifiers (e.g., a container identifier and/or a pose identifier). The rotatable support surface may be a rotatable pedestal with a receiving surface, as otherwise described herein. The rotatable support surface may be positionable inside of a CT imager. The position and orientation of the container on the rotatable support surface in the CT imager is the container pose.

At operation 904, the container is identified. The container may be identified based on a user selection at the CT imager, a pre-shot or one or more 2D images from a CT scan, an RFID tag, a barcode, lead ink, a marker on the container, or other shape recognition of the container (e.g., based on a container identifier). The container has a geometry that is known by the CT imager. For example, the geometries of a variety of containers may be pre-programmed into CT imager, calibrated by the CT imager (e.g., using a phantom or target container), or otherwise accessible by the CT imager (e.g., via data transfer from other imagers, other devices, past images, etc.).

At operation 906, a mask corresponding with the container is determined. The mask is estimated to be in a mask pose in a 3D dimensional space. The mask is determined based on the geometry of the identified container and the mask pose is determined based on the container pose. The container pose is estimated based on a known position and orientation of the rotatable support surface and the key-based coupling of the container in a pose relative to the rotatable support surface.

At operation 908, the container and the specimen are rotated through a plurality of imaging angles. For at least one of the imaging angles, a portion of the container may be positioned between an imaging source and the specimen. The container and the specimen may rotate with a rotation of the rotatable support surface about a rotation axis.

At operation 910, a plurality of images are acquired of the container and the specimen at the imaging angles. The plurality of images may be acquired for each angle of the plurality of imaging angles. In an example, an image is acquired, for a 360-degree rotation, at each degree, at each half degree, at every two degrees, or any other rotational degree increment.

At operation 912, a constructed three-dimensional image of the container and the specimen is generated. The constructed three-dimensional image may be based on a set of 2D images generated from the CT scan. The three-dimensional image may be generated in real time, concurrently with the CT scan.

At operation 914, the mask is applied to the three-dimensional image. The mask is applied to the three-dimensional image in a mask pose. As described herein, the mask pose may be based at least in part on the known imaging distance and the key. A tolerance of the mask pose may be determined to adjust the mask pose. Determining the tolerance may include tracking an image-traceable marker (e.g., a pose identifier) on the container in the set of 2D images.

The mask in the mask pose (e.g., as may be adjusted based on tolerance), may be applied on a pixel-by-pixel basis or on a voxel-by-voxel basis. For example, the mask may be applied to artifact-related pixels in each 2D image of a set of 2D images obtained from the CT scan, which may then be used to construct a 3D image (e.g., applying the mask pre-construction of the 3D image). Alternatively, the mask may be applied directly to artifact-related voxels in the constructed 3D image after or during construction of the 3D image (e.g., after or during the CT scan).

Pixels or voxels may be masked by labelling or tagging. For example, when a mask is applied, labelled pixels or voxels are hidden (e.g., filtered) and when a mask is removed the labelled pixels or voxels are shown (e.g., not filtered). Alternatively, pixels or voxels associated with a mask in a mask pose may be removed from an image. An unmasked image may then be represented by a second copy of the image without any pixels or voxels removed. The mask may be added or removed from a 3D image based on a user indication.

Figure 10:
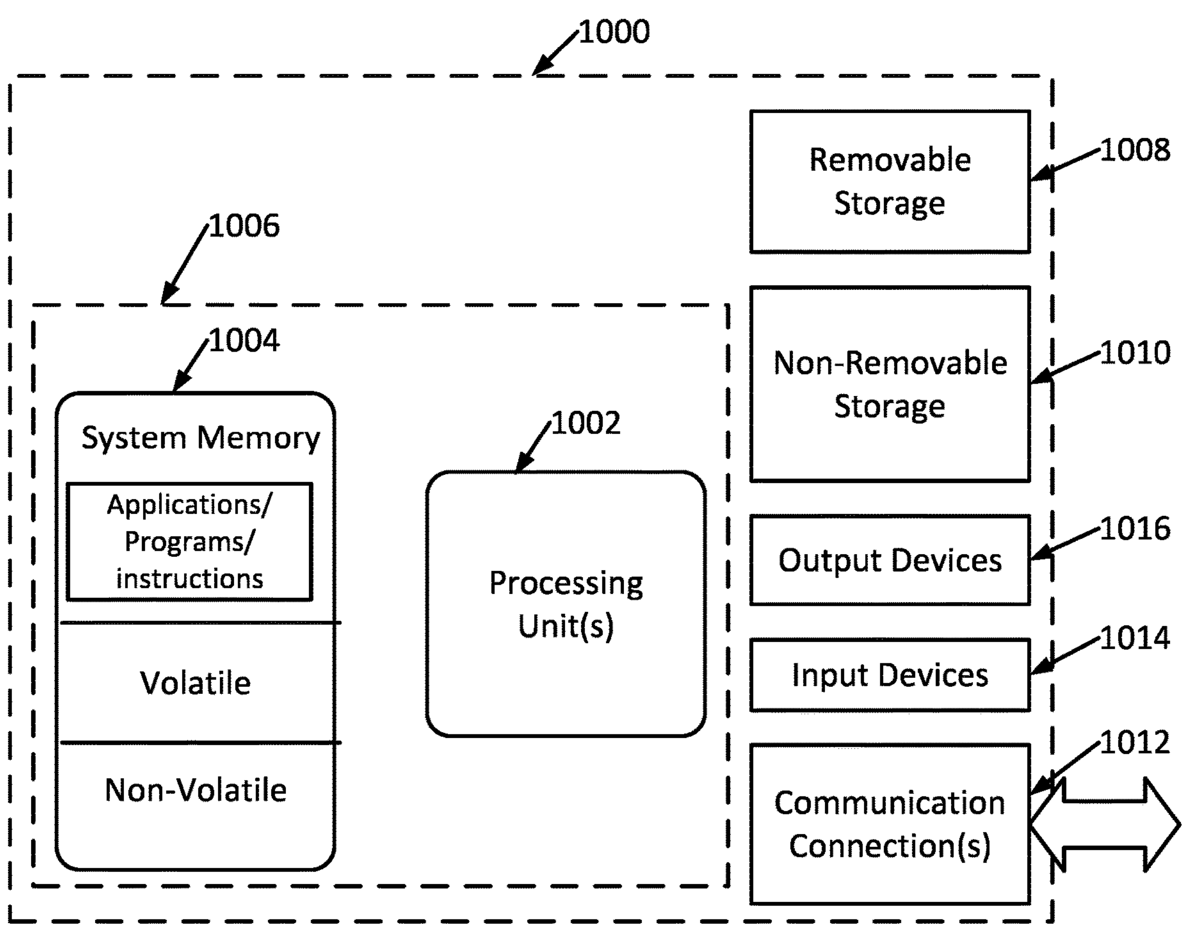
FIG. 10 illustrates an example suitable operating environment for a specimen imaging system.

FIG. 10 illustrates an example suitable operating environment 1000 for a specimen imaging system described herein. In its most basic configuration, operating environment 1000 typically includes at least one processing unit (or processor) 1002 and memory 1004. Depending on the exact configuration and type of computing device, memory 1004 (storing, instructions to perform projection of an image onto a specimen) may be volatile (such as RAM), non-volatile (such as RAM, flash memory, etc.), or some combination of the two. This most basic configuration is illustrated in FIG. 10 by dashed line 1006. Further, environment 1000 may also include storage devices (removable 1008, and/or non-removable 1010) including, but not limited to, magnetic or optical disks or tape. Similarly, environment 1000 may also have input device(s) 1014 such as keyboard, mouse, pen, voice input, etc. and/or output device(s) 1016 such as a display, speakers, printer, etc. Also included in the environment may be one or more communication connections 1012, such as LAN, WAN, point to point, etc. In embodiments, the connections may be operable to facility point-to-point communications, connection-oriented communications, connectionless communications, etc.

Operating environment 1000 typically includes at least some form of computer readable media. Computer readable media can be any available media that can be accessed by processing unit (or processor) 1002 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of the any of the above should also be included within the scope of computer readable media.

The operating environment 1000 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

As should be appreciated, while the above methods have been described in a particular order, no such order is inherently necessary for each operation identified in the methods. For instance, the operations identified in the methods may be performed concurrently with other operations or in different orders. In addition, the methods described above may be performed by the systems described herein. For example, a system may have at least one processor and memory storing instructions that, when executed by the at least one processor, cause the system to perform the methods described herein.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

Although aspects of the present disclosure are described with respect to image analysis of excised breast tissue, it should be appreciated that the present disclosure may also be useful in variety of other applications where a plurality of imaging modes may improve image quality and/or efficiency of a specimen, tissue, bone, living organism, body part, or any other object, living or dead.

Additionally, although example provided herein describe masking a container in a 3D image, it is appreciated that a mask may be applied to any other object of known shape, size, and pose in the 3D image.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art. Further, as used herein and in the claims, the phrase "at least one of element A, element B, or element C" is intended to convey any of: element A, element B, element C, elements A and B, elements A and C, elements B and C, and elements A, B, and C.

Although specific embodiments are described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

EXAMPLES

Illustrative examples of the systems and methods described herein are provided below. An embodiment of the system or method described herein may include any one or more, and any combination of, the clauses described below:

Clause 1. A method for masking a container in a computerized tomography (CT) image, the method comprising: receiving a specimen secured in the container on a rotatable support surface, wherein the rotatable support surface is configured to rotate about an axis at a known imaging distance to an imaging source; identifying the container; determining a mask corresponding to the container, based at least in part on the identification of the container; rotating the specimen in the container about the axis through a plurality of imaging angles; while rotating the specimen through the plurality of imaging angles, imaging the specimen with the imaging source to obtain a set of 2D images; based on the set of 2D images, generating a 3D image comprising a 3D representation of the specimen and a 3D representation of the container; applying the mask to the 3D image to mask the 3D representation of the container; and displaying the 3D image comprising the 3D representation of the specimen and the masked 3D representation of the container.

Clause 2. The method of any one of clauses 1-13, wherein at least a portion of the container is positioned between the imaging source and the specimen while rotating the specimen through the plurality of imaging angles.

Clause 3. The method of any one of clauses 1-13, wherein the container is identified from a set of known containers.

Clause 4. The method of any one of clauses 1-13, wherein identifying the container is based on at least one of: obtaining an image captured prior to obtaining the set of 2D images; receiving a user selection; and identifying an identifier on the container.

Clause 5. The method of any one of clauses 1-13, further comprising: calibrating a system for performing the method prior to receiving the specimen secured in the container on the rotatable support surface.

Clause 6. The method of any one of clauses 1-13, wherein at least one of the container and the rotatable support surface comprise a key for disposing the container in a container pose relative to the rotatable support surface when the container is received at the rotatable support surface.

Clause 7. The method of any one of clauses 1-13, further comprising: estimating a mask pose of the mask in the 3D image, based at least in part on the known imaging distance and the key; determining a tolerance of the mask pose; and based at least in part on the tolerance, adjusting the mask pose.

Clause 8. The method of any one of clauses 1-13, wherein determining the tolerance includes tracking an image-traceable marker on the container in the set of 2D images.

Clause 9. The method of any one of clauses 1-13, wherein applying the mask includes labeling a set of voxels in the 3D image.

Clause 10. The method of any one of clauses 1-13, further comprising labeling the set of voxels after the 3D image is generated.

Clause 11. The method of any one of clauses 1-13, wherein applying the mask further includes labeling a set of pixels in the set of 2D images, and wherein the labeled set of voxels in the 3D image are based on the set of pixels labeled in the 2D images.

Clause 12. The method of any one of clauses 1-13, wherein applying the mask includes removing the labeled set of voxels from the 3D image.

Clause 13. The method of any one of clauses 1-13, further comprising: receiving an instruction to remove the mask from the 3D image; removing the mask from the 3D representation of the container in the 3D image; and displaying the 3D image comprising the 3D representation of the specimen and the 3D representation of the container.

Clause 14. An apparatus for imaging a specimen, the apparatus comprising: a housing defining an interior chamber; a pedestal disposed within the interior chamber of the housing, wherein the pedestal is configured to rotate about an axis and removably couple to a container holding the specimen, wherein at least one of the pedestal and the container comprise a key; an imaging source disposed within the housing, the imaging source configured to project a beam inside the interior chamber and positioned a known imaging distance from the axis of the pedestal; a display; a processor; memory storing instructions that, when executed by the processor, cause the apparatus to perform a set of operations comprising: upon receiving the container holding the specimen on the pedestal, identifying the container; determining a mask corresponding to the container, based on the identification of the container; rotating the container and the specimen about the axis through a plurality of imaging angles; while rotating the container and the specimen through the plurality of imaging angles, imaging the container and the specimen with the imaging source to obtain a set of 2D images; based on the set of 2D images, generating a 3D image comprising a 3D representation of the specimen and a 3D representation of the container; applying the mask to the 3D image to mask the 3D representation of the container; and displaying, on the display, the 3D image comprising the 3D representation of the specimen and the masked 3D representation of the container.

Clause 15. The apparatus of any one of clauses 14-19, further comprising a pedestal key on the pedestal, wherein the pedestal key is configured for interlocking with a container key on the container.

Clause 16. The apparatus of any one of clauses 14-19, wherein the container includes an image-traceable marker and wherein the container is in a container pose in the interior chamber, the set of operations further comprising: estimating a mask pose of the mask in the 3D image, based at least in part on the known imaging distance and the key; identifying the image-traceable marker in at least one image of the set of 2D images; determining a tolerance of the mask pose, based the identification of the image-traceable marker; and based at least in part on the tolerance, adjusting the mask pose.

Clause 17. The apparatus of any one of clauses 14-19, wherein applying the mask includes: labeling a set of voxels in the 3D image associated with a precise pose of the mask.

Clause 18. The apparatus of any one of clauses 14-19, wherein applying the mask further includes: removing the labeled set of voxels from the 3D image.

Clause 19. The apparatus of any one of clauses 14-19, the set of operations further comprising: receiving an instruction to remove the mask from the 3D image; removing the mask from the 3D representation of the container in the 3D image; and displaying the 3D image comprising the 3D representation of the specimen and the 3D representation of the container.

Clause 20. A method for masking a container holding a specimen, the method comprising: receiving the container holding the specimen on a rotatable support surface in a container pose relative to the rotatable support surface, the rotatable support surface configured to rotate about an axis at an imaging distance from an imaging source; identifying the container; determining a mask corresponding to the container, based on the identification of the container; rotating the container and the specimen about the axis through a plurality of imaging angles; while rotating the container and the specimen through the plurality of imaging angles, imaging the container and the specimen with the imaging source to obtain a set of 2D images; based on the set of 2D images, generating a 3D image comprising a 3D representation of the specimen and a 3D representation of the container; estimating a mask pose of the mask in the 3D image, based at least in part on the known imaging distance; identifying a position of a marker on the container in the set of 2D images; based on the identified position of the marker, determining a tolerance of the mask; adjusting the mask pose of the mask based on the tolerance; applying the mask in the adjusted mask pose to the 3D image to mask the 3D representation of the container; and displaying the 3D image comprising the 3D representation of the specimen and the masked 3D representation of the container.

What is claimed is:

1. A method for masking a container in a computerized tomography (CT) image, the method comprising:

receiving a specimen secured in the container on a rotatable support surface, wherein the rotatable support surface is configured to rotate about an axis at a known imaging distance to an imaging source;

identifying a geometry of the container;

determining a mask corresponding to the container, based at least in part on the identification of the geometry of the container;

rotating the specimen in the container about the axis through a plurality of imaging angles;

while rotating the specimen through the plurality of imaging angles, imaging the specimen with the imaging source to obtain a set of 2D images;

based on the set of 2D images, generating a 3D image comprising a 3D representation of the specimen and a 3D representation of the container;

applying the mask to the 3D image to mask the 3D representation of the container; and displaying the 3D image comprising the 3D representation of the specimen and the masked 3D representation of the container.

2. The method of claim 1, wherein at least a portion of the container is positioned between the imaging source and the specimen while rotating the specimen through the plurality of imaging angles.

3. The method of claim 1, wherein the geometry of the container is identified from a set of known containers.

4. The method of claim 1, wherein identifying the geometry of the container is based on at least one of:

obtaining an image captured prior to obtaining the set of 2D images;

receiving a user selection; and identifying an identifier on the container.

5. The method of claim 1, further comprising:

calibrating a system for performing the method prior to receiving the specimen secured in the container on the rotatable support surface.

6. The method of claim 1, wherein at least one of the container and the rotatable support surface comprise a key for disposing the container in a container pose relative to the rotatable support surface when the container is received at the rotatable support surface.

7. The method of claim 6, further comprising:

estimating a mask pose of the mask in the 3D image, based at least in part on the known imaging distance and the key;

determining a tolerance of the mask pose; and based at least in part on the tolerance, adjusting the mask pose.

8. The method of claim 7, wherein determining the tolerance includes tracking an image-traceable marker on the container in the set of 2D images.

9. The method of claim 1, wherein applying the mask includes labeling a set of voxels in the 3D image.

10. The method of claim 9, further comprising labeling the set of voxels after the 3D image is generated.

11. The method of claim 9, wherein applying the mask further includes labeling a set of pixels in the set of 2D images, and wherein the labeled set of voxels in the 3D image are based on the set of pixels labeled in the 2D images.

12. The method of claim 9, wherein applying the mask includes removing the labeled set of voxels from the 3D image.

13. The method of claim 1, further comprising:

receiving an instruction to remove the mask from the 3D image;

removing the mask from the 3D representation of the container in the 3D image; and displaying the 3D image comprising the 3D representation of the specimen and the 3D representation of the container.

14. An apparatus for imaging a specimen, the apparatus comprising:

a housing defining an interior chamber;

a pedestal disposed within the interior chamber of the housing, wherein the pedestal is configured to rotate about an axis and removably couple to a container holding the specimen, wherein at least one of the pedestal and the container comprise a key;

an x-ray imaging source disposed within the housing, the x-ray imaging source configured to project an x-ray beam inside the interior chamber and positioned a known imaging distance from the axis of the pedestal;

a display;

a processor;

memory storing instructions that, when executed by the processor, cause the apparatus to perform a set of operations comprising:

upon receiving the container holding the specimen on the pedestal, identifying a geometry of the container;

determining a mask corresponding to the container, based on the identification of the geometry of the container;

rotating the container and the specimen about the axis through a plurality of imaging angles;

while rotating the container and the specimen through the plurality of imaging angles, x-ray imaging the container and the specimen with the x-ray imaging source to obtain a set of 2D images;

based on the set of 2D images, generating a 3D image comprising a 3D representation of the specimen and a 3D representation of the container;

applying the mask to the 3D image to mask the 3D representation of the container; and displaying, on the display, the 3D image comprising the 3D representation of the specimen and the masked 3D representation of the container.

15. The apparatus of claim 14, further comprising a pedestal key on the pedestal, wherein the pedestal key is configured for interlocking with a container key on the container.

16. The apparatus of claim 14, wherein the container includes an image-traceable marker and wherein the container is in a container pose in the interior chamber, the set of operations further comprising:

estimating a mask pose of the mask in the 3D image, based at least in part on the known imaging distance and the key;

identifying the image-traceable marker in at least one image of the set of 2D images;

determining a tolerance of the mask pose, based the identification of the image-traceable marker; and based at least in part on the tolerance, adjusting the mask pose.

17. The apparatus of claim 16, wherein applying the mask includes:

labeling a set of voxels in the 3D image associated with a precise pose of the mask.

18. The apparatus of claim 17, wherein applying the mask further includes:

removing the labeled set of voxels from the 3D image.

19. The apparatus of claim 18, the set of operations further comprising:

receiving an instruction to remove the mask from the 3D image;

removing the mask from the 3D representation of the container in the 3D image; and displaying the 3D image comprising the 3D representation of the specimen and the 3D representation of the container.

20. A method for masking a container holding a specimen, the method comprising:

receiving the container holding the specimen on a rotatable support surface in a container pose relative to the rotatable support surface, the rotatable support surface configured to rotate about an axis at an imaging distance from an x-ray imaging source;

identifying the container;

determining a mask corresponding to the container, based on the identification of the container;

rotating the container and the specimen about the axis through a plurality of imaging angles;

while rotating the container and the specimen through the plurality of imaging angles, x-ray imaging the container and the specimen with the x-ray imaging source to obtain a set of 2D images;

based on the set of 2D images, generating a 3D image comprising a 3D representation of the specimen and a 3D representation of the container;

estimating a mask pose of the mask in the 3D image, based at least in part on the known imaging distance;

identifying a position of a marker on the container in the set of 2D images;

based on the identified position of the marker, determining a tolerance of the mask;

adjusting the mask pose of the mask based on the tolerance;

applying the mask in the adjusted mask pose to the 3D image to mask the 3D representation of the container; and displaying the 3D image comprising the 3D representation of the specimen and the masked 3D representation of the container.

* * * * *